United States Patent
Gollapudi (10) Patent No.: US 8,255,397 B2
(45) Date of Patent: Aug. 28, 2012

(54) METHOD AND APPARATUS FOR DOCUMENT CLUSTERING AND DOCUMENT SKETCHING

(75) Inventor: Sreenivas Gollapudi, Cupertino, CA (US)

(73) Assignee: Ebrary, Palo Alto, CA (US)

( * ) Notice: Subject to any disclaimer, the term of this patent is extended or adjusted under 35 U.S.C. 154(b) by 351 days.

(21) Appl. No.: 12/198,841

(22) Filed: Aug. 26, 2008

(65) Prior Publication Data

US 2008/0319941 A1    Dec. 25, 2008

Related U.S. Application Data

(63) Continuation of application No. 11/427,781, filed on Jun. 29, 2006, now Pat. No. 7,433,869.

(60) Provisional application No. 60/695,969, filed on Jul. 1, 2005.

(51) Int. Cl.
*G06F 17/30* (2006.01)

(52) U.S. Cl. .............................. 707/736; 707/737

(58) Field of Classification Search ............ 707/737, 707/711, 723, 727, 728, 729, 730, 750, 754, 707/812, 736
See application file for complete search history.

(56) References Cited

U.S. PATENT DOCUMENTS

| | | | |
|---|---|---|---|
| 4,404,649 A | 9/1983 | Nunley et al. | |
| 4,941,170 A | 7/1990 | Herbst | |
| 5,068,888 A | 11/1991 | Scherk et al. | |
| 5,196,943 A | 3/1993 | Hersee et al. | |
| 5,237,157 A | 8/1993 | Kaplan | |
| 5,237,673 A | 8/1993 | Orbits et al. | |
| 5,247,575 A | 9/1993 | Sprague et al. | |
| 5,291,405 A | 3/1994 | Kohari | |
| 5,295,181 A | 3/1994 | Kuo | |
| 5,307,452 A | 4/1994 | Hahn et al. | |
| 5,327,265 A | 7/1994 | McDonald | |

(Continued)

FOREIGN PATENT DOCUMENTS

EP    0881591    12/1998

(Continued)

OTHER PUBLICATIONS

Cattoni, et al; "Geometric Layout Analysis Techniques for Document Image Understanding," Jan. 1998, Review, ITC-IRST Technical Report #9703-09, pp. 1-68, XP002229195, Trento, Italy.

(Continued)

*Primary Examiner* — Christyann Pulliam
*Assistant Examiner* — Fariborz Khoshnoodi
(74) *Attorney, Agent, or Firm* — Michael A. Glenn; Glenn Patent Group (57) ABSTRACT

A first embodiment of the invention provides a system that automatically classifies documents in a collection into clusters based on the similarities between documents, that automatically classifies new documents into the right clusters, and that may change the number or parameters of clusters under various circumstances. A second embodiment of the invention provides a technique for comparing two documents, in which a fingerprint or sketch of each document is computed. In particular, this embodiment of the invention uses a specific algorithm to compute the document's fingerprint. One embodiment uses a sentence in the document as a logical delimiter or window from which significant words are extracted and, thereafter, a hash is computed of all pair-wise permutations. Words are extracted based on their weight in the document, which can be computed using measures such as term frequency and the inverse document frequency.

4 Claims, 5 Drawing Sheets

U.S. PATENT DOCUMENTS

| | | |
|---|---|---|
| 5,421,779 A | 6/1995 | Castro |
| 5,444,779 A | 8/1995 | Daniele |
| 5,465,299 A | 11/1995 | Matsumoto et al. |
| 5,486,686 A | 1/1996 | Zdybel et al. |
| 5,509,074 A | 4/1996 | Choudhury et al. |
| 5,513,013 A | 4/1996 | Kuo |
| 5,532,920 A | 7/1996 | Hartrick et al. |
| 5,546,528 A | 8/1996 | Johnson |
| 5,592,549 A | 1/1997 | Nagel et al. |
| 5,598,279 A | 1/1997 | Ishii et al. |
| 5,619,247 A | 4/1997 | Russo |
| 5,625,711 A | 4/1997 | Nicholson |
| 5,629,980 A | 5/1997 | Stefik et al. |
| 5,629,981 A | 5/1997 | Nerlikar |
| 5,643,064 A | 7/1997 | Grinderslev |
| 5,664,109 A | 9/1997 | Johnson et al. |
| 5,673,316 A | 9/1997 | Auerbach et al. |
| 5,680,479 A | 10/1997 | Wang et al. |
| 5,696,841 A | 12/1997 | Nakatsuka |
| 5,701,500 A | 12/1997 | Ikeo et al. |
| 5,729,637 A | 3/1998 | Nicholson |
| 5,737,599 A | 4/1998 | Rowe |
| 5,754,308 A | 5/1998 | Lopresti et al. |
| 5,781,785 A | 7/1998 | Rowe |
| 5,790,793 A | 8/1998 | Higley |
| 5,802,518 A | 9/1998 | Karaev et al. |
| 5,819,092 A | 10/1998 | Ferguson et al. |
| 5,819,301 A | 10/1998 | Rowe |
| 5,832,530 A | 11/1998 | Paknad |
| 5,835,530 A | 11/1998 | Hawkes |
| 5,848,184 A | 12/1998 | Taylor et al. |
| 5,860,074 A | 1/1999 | Rowe |
| 5,881,230 A | 3/1999 | Christensen et al. |
| 5,892,900 A | 4/1999 | Ginter et al. |
| 5,930,813 A | 7/1999 | Padgett |
| 5,933,498 A | 8/1999 | Schnech et al. |
| 5,949,555 A | 9/1999 | Sakai et al. |
| 5,982,956 A | 11/1999 | Lahmi |
| 5,987,480 A | 11/1999 | Donohue et al. |
| 5,991,780 A | 11/1999 | Rivette et al. |
| 5,999,649 A | 12/1999 | Nicholson |
| 6,006,240 A | 12/1999 | Handley |
| 6,012,083 A | 1/2000 | Savitzky et al. |
| 6,041,316 A | 3/2000 | Allen |
| 6,047,377 A | 4/2000 | Gong |
| 6,049,339 A | 4/2000 | Schiller |
| 6,070,158 A | 5/2000 | Kirsch et al. |
| 6,119,124 A | 9/2000 | Broder et al. |
| 6,134,552 A | 10/2000 | Fritz et al. |
| 6,157,924 A | 12/2000 | Austin |
| 6,185,684 B1 | 2/2001 | Pravetz |
| 6,192,165 B1 | 2/2001 | Irons |
| 6,205,456 B1 | 3/2001 | Nakao |
| 6,212,530 B1 | 4/2001 | Kadlec |
| 6,272,488 B1 | 8/2001 | Chang et al. |
| 6,282,653 B1 | 8/2001 | Berstis et al. |
| 6,289,450 B1 | 9/2001 | Pensak et al. |
| 6,289,462 B1 | 9/2001 | McNabb et al. |
| 6,321,256 B1 | 11/2001 | Himmel et al. |
| 6,324,265 B1 | 11/2001 | Christie et al. |
| 6,327,600 B1 | 12/2001 | Satoh et al. |
| 6,345,279 B1 | 2/2002 | Li |
| 6,356,936 B1 | 3/2002 | Donoho |
| 6,357,010 B1 | 3/2002 | Viets et al. |
| 6,363,376 B1 | 3/2002 | Wiens et al. |
| 6,385,350 B1 | 5/2002 | Nicholson |
| 6,389,541 B1 | 5/2002 | Patterson |
| 6,446,068 B1 | 9/2002 | Kortge |
| 6,493,763 B1 | 12/2002 | Suzuki |
| 6,516,337 B1 | 2/2003 | Tripp |
| 6,523,026 B1 | 2/2003 | Gillis |
| 6,565,611 B1* | 5/2003 | Wilcox et al. ................. 715/203 |
| 6,606,613 B1 | 8/2003 | Altschuler et al. |
| 6,629,097 B1 | 9/2003 | Keith |
| 6,640,010 B2 | 10/2003 | Seeger et al. |
| 6,725,429 B1 | 4/2004 | Gardner et al. |
| 6,732,090 B2 | 5/2004 | Shanahan et al. |
| 6,810,376 B1* | 10/2004 | Guan et al. ........................ 704/9 |
| 6,870,547 B1 | 3/2005 | Crosby et al. |
| 6,920,610 B1 | 7/2005 | Lawton et al. |
| 6,931,534 B1 | 8/2005 | Jandel et al. |
| 6,988,124 B2 | 1/2006 | Douceur et al. |
| 7,069,451 B1 | 6/2006 | Ginter et al. |
| 7,079,278 B2 | 7/2006 | Sato |
| 7,110,126 B1 | 9/2006 | Lapstun et al. |
| 7,130,831 B2 | 10/2006 | Howard et al. |
| 7,133,845 B1 | 11/2006 | Ginter et al. |
| 7,290,285 B2 | 10/2007 | McCurdy et al. |
| 7,536,561 B2 | 5/2009 | Warnock et al. |
| 2002/0042793 A1* | 4/2002 | Choi ................................. 707/6 |
| 2002/0065857 A1 | 5/2002 | Michalewicz et al. |
| 2002/0138528 A1 | 9/2002 | Gong et al. |
| 2002/0143807 A1 | 10/2002 | Komatsu |
| 2003/0033288 A1 | 2/2003 | Shanahan |
| 2003/0037094 A1 | 2/2003 | Douceur et al. |
| 2003/0037181 A1 | 2/2003 | Freed |
| 2003/0061200 A1 | 3/2003 | Hubert |
| 2003/0185448 A1 | 10/2003 | Seeger et al. |
| 2004/0030680 A1 | 2/2004 | Veit |
| 2004/0030741 A1 | 2/2004 | Wolton et al. |
| 2004/0133544 A1 | 7/2004 | Kiessig |
| 2004/0133545 A1 | 7/2004 | Kiessig |
| 2004/0133588 A1 | 7/2004 | Kiessig |
| 2004/0133589 A1 | 7/2004 | Kiessig |
| 2004/0205448 A1 | 10/2004 | Grefenstette |
| 2004/0239681 A1 | 12/2004 | Robotham et al. |
| 2005/0022114 A1 | 1/2005 | Shanahan |
| 2005/0044487 A1* | 2/2005 | Bellegarda et al. ........... 715/511 |
| 2007/0097959 A1* | 5/2007 | Taylor .......................... 370/352 |

FOREIGN PATENT DOCUMENTS

| | | |
|---|---|---|
| EP | 0881592 | 12/1998 |
| EP | 0881592(B1) | 10/2002 |
| EP | 1284461 A1 | 2/2003 |
| EP | 0881591(B1) | 9/2003 |
| JP | 2001175807 | 6/2001 |
| WO | WO 96/27155 | 9/1996 |
| WO | WO 98/42098 | 9/1998 |
| WO | WO 99/05618 | 4/1999 |
| WO | WO 99/39286 | 5/1999 |
| WO | WO 01/20596 A1 | 3/2001 |
| WO | WO 01/57711 A1 | 9/2001 |
| WO | WO 02/41170 A2 | 5/2002 |
| WO | WO 2004/051555 A2 | 6/2004 |
| WO | WO 2005/062192 A1 | 7/2005 |

OTHER PUBLICATIONS

Figa, E., et al., "Lexical Inference Mechanisms for Text Understanding and Classification," 2003, Proceedings of the 66th ASIST Annual Meeting, Humanizing Information Technology: From Ideas to Bits and Back, ASIST 2003, Information Today, Inc., pp. 165-73, Medford, NJ, USA.

Chuan-Jie Lin, et al., "Description of Preliminary Results to TREC-8 QA Task," 2000, Information Technology: Eighth Text Retrieval Conference (TREC-8) (NIST SP 500-246), pp. 507-512, NIST, Gaithersburg, MD, USA.

Embley, D.W., et al., "Conceptual-Model-Based Data Extraction from Multiple-Record Web Pages," Nov. 1999, Data & Knowledge Engineering, vol. 31, No. 3, pp. 227-251, Elsevier, Netherlands.

Embley, D.W., et al., "A Conceptual-Modeling Approach to Extracting Data from the Web," 1998, Conceptual Modeling—ER'98, 17th International Conference on Conceptual Modeling, Proceedings pp. 78-91, Springer-Verlag, Berlin, Germany.

Bartel, "Probabilistic Approximation of Metric Spaces and Its Algorithmic Applications," 1996, In: FOCS Proceedings of the 37th Annual Symposium on Foundations of Computer Science. Washington DC, IEEE, Abstract, pp. 2-3, ISSN 0272-5428.

Zhang, et al., "BIRCH: An Efficient Data Clustering Method for Very Large Databases," 1996, In: ACM Sigmod Record, Proceedings of the 1996 ACM SIGMOD International Conference on Management of Data, New York: ACM Press, vol. 25, Issue 2, pp. 103-14, ISSN 0163-5808.

"jar-The Java Archive Tool" Sun Microsystems as taken from—http://web.archive.org/web/20030418074845/http://java.sun.com/j2se/1.4.2/docs/tooldocs/windows/jar.html (Web archive from Apr. 18, 2003).

Song, W. et al.; "A semantic similarity approach to electronic document modeling and integration"; Jun. 2000, Proc. of the 1st Int'l Web Information Systems Engineering Conference on Hong Kong, Los Alamitos, CA, pp. 116-124.

Mani I Ed et al.; "Recent developments in text summarization"; Nov. 5-10, 2001; Proc. of the 2001 ACM CIKM 10th Int'l Conf. on Information and Knowledge Management; Atlanta, GA, pp. 529-531.

Carchiolo, V. et al.; "Improving WEB usability by categorizing information"; Oct. 2003; Proc. Int'l Conf. on Web Intelligence; Piscataway, NJ, pp. 146-152.

European Search Report mailed Aug. 20, 2010 for related European patent application No. EP06748238, 7 pages.

Chen, Liren, et al.; "WebMate: a personal agent for browsing and searching"; May 1998; Proc. of the 2nd Int'l Conf. on Autonomous Agents; pp. 132-139.

Zamir, Oren et al.; "Grouper: a dynamic clustering interface to Web search results"; May 1999; Proc. of the 8th Int'l Conf. on World Wide Web; Toronto, Canada, pp. 1361-1374.

Parodi, P., et al., "Efficient and Flexible Text Extraction from Document Pages," Dec. 1999, International Journal on Document Analysis and Recognition, vol. 2, No. 2-3, pp. 67-79, Springer-Verlag, Germany.

Yan-Min Chen, et al., "Multi-Document Summarization Based on Lexical Chains," Aug. 2005, Proceedings of 2005 International Conference on Machine Learning and Cybernetics, IEEE, Piscataway, NJ, USA.

Guoren Wang, et al., "Design and Implementation of a Semantic Document Management System," Jan. 2005, Information Technology Journal, vol. 4, No. 1, pp. 21-31, Pakistan.

Mouri, T., et al., "Extracting New Topic Contents from Hidden Web Sites," Apr. 2004, Proceedings ITCC 2004, International Conference on Information Technology: Coding and Computing, IEEE Comput. Soc., vol. 1, pp. 314-319, Los Alamitos, CA, USA.

Srihari, S.N., et al., "Forensic Handwritten Document Retrieval System," Jan. 2004, Proceedings First Workshop on Document Image Analysis for Libraries, IEEE Comput. Soc, pp. 188-194, Los Alamitos, CA, USA.

Estievenart, F., et al., "A Tool-Supported Method to Extract Data and Schema from Web Sites," Sep. 2003, Proceedings Fifth IEEE International Workshop on Web Site Evolution Theme, Architecture, IEEE Comput. Soc, pp. 3-11, Los Alamitos, CA, USA.

Knoll, A., et al., "An Integrated Approach to Semantic Evaluation and Content-Based Retrieval of Multimedia Documents," Sep. 1998, Research and Advanced Technology for Digital Libraries, Second European Conference, ECDL'98, Proceedings pp. 409-428, Springer-Verlag, Berlin, Germany.

Fujisawa, H., et al., "Automatically Organizing Document Bases Using Document Understanding Techniques," Apr. 1992, Future Databases, Proceedings of the Second Far-East Workshop on Future Database Systems, pp. 244-253, World Scientific, Singapore.

Keshi, I. et al., "A Knowledge-Based Framework in an Intelligent Assistant System for Making Documents," Aug. 1989, Future Generation Computer Systems, vol. 5, No. 1, pp. 51-58, Netherlands.

* cited by examiner

$sketch(document) = S(D) = \{S_{13}, S_{45}, S_1, S_2, S_6, ..., S_{23}\}$

*FIG. 4*

*Hierarchical Clusters*

*Taxonomy*

FIG. 5

METHOD AND APPARATUS FOR DOCUMENT CLUSTERING AND DOCUMENT SKETCHING

CROSS REFERENCE TO RELATED APPLICATIONS

This application is a continuation of U.S. patent application Ser. No. 11/427,781 filed Jun. 29, 2006 now U.S. Pat. No. 7,433,869, and claims priority to U.S. Patent Application No. 60/695,939 filed 1 Jul. 2005, which are incorporated herein in their entirety by references hereto.

BACKGROUND OF THE INVENTION

1. Technical Field

The invention relates to automatic document classification. More particularly, the invention relates to a method and apparatus for automatic document classification using either document clustering and document sketch techniques.

2. Description of the Prior Art

Typically, document similarities are measured based on the content overlap between the documents. Such approaches do not permit efficient similarity computations. Thus, it would be advantageous to provide an approach that performed such measurements in a computationally efficient manner.

Documents come in varying sizes and formats. The large size and many formats of the documents makes the process of performing any computations on them very inefficient. Comparing two documents is an oft performed computation on documents. Therefore, it would be useful to compute a fingerprint or a sketch of a document that satisfies at least the following requirements:

It is unique in the document space. Only the same documents share the same sketch.

The sketch is small, thereby allowing efficient computations such as similarity and containment.

Its computation is efficient.

It can be efficiently computed on a collection of documents (or sketches).

The sketch admits partial matches between documents. For example, a 60% similarity between two sketches implies 60% similarity between the underlying documents.

There are known algorithms that compute document fingerprints. Broder's implementation (see Andrei Z. Broder, *Some applications of Rabin's fingerprinting method*, In Renato Capocelli, Alfredo De Santis, and Ugo Vaccaro, editors, *Sequences II: Methods in Communications, Security, and Computer Science*, pages 143-152. Springer-Verlag, 1993) based on document shingles is a widely used algorithm. This algorithm is very effective when computing near similarity or total containment of documents. In the case of comparing documents where documents can overlap with one another to varying degrees, Broder's algorithm is not very effective. It is necessary to compute similarities of varying degrees. To this end, it would be desirable to provide a method to compute document sketches that allows for effective and efficient similarity computations among other requirements.

SUMMARY OF THE INVENTION

A first embodiment of the invention provides a system that automatically classifies documents in a collection into clusters based on the similarities between documents, that automatically classifies new documents into the right clusters, and that may change the number or parameters of clusters under various circumstances.

A second embodiment of the invention provides a technique for comparing two documents, in which a fingerprint or sketch of each document is computed. In particular, this embodiment of the invention uses a specific algorithm to compute each document's fingerprint. One embodiment uses a sentence in the document as a logical delimiter or window from which significant words are extracted and, thereafter, a hash is computed of all pair-wise permutations of the significant words. The significant words are extracted based on their weight in the document, which can be computed using measures such as term frequency and inverse document frequency. This approach is resistant to variations in text flow due to insertions of text in the middle of the document.

DETAILED DESCRIPTION OF THE INVENTION

A first embodiment of the invention provides a system that automatically classifies documents in a collection into clusters based on the similarities between documents, that automatically classifies new documents into the right clusters, and that may change the number or parameters of clusters under various circumstances. A second embodiment of the invention provides a technique for comparing two documents, in which a fingerprint or sketch of each document is computed. In particular, this embodiment of the invention uses a specific algorithm to compute the document's fingerprint. One embodiment uses a sentence in the document as a logical delimiter or window from which significant words are extracted and, thereafter, a hash is computed of all pair-wise permutations. Words are extracted based on their weight in the document, which can be computed using measures such as term frequency and the inverse document frequency.

Document Clustering

A first embodiment of the invention is related to an automatic classification system which allows for:

(1) a collection of documents to be automatically classified into clusters based on the similarities between the documents, and (2) new documents to be automatically classified into clusters based on similarities between new and/or existing documents, and/or based on existing clusters, and (3) new clusters to be added, or existing clusters to be combined or modified, by a processor based on automatic processes.

Typically, document similarities are measured based on the content overlap between the documents. For efficient similarity computations, a preferred embodiment of the invention uses the document sketches instead of the documents. Another measure of choice is the document distance. The document distance, which is inversely related to similarity, is mathematically proven to be a metric. Formally, a metric is a function that assigns a distance to elements in a domain. The inventors have found that the similarity measure is not a metric. The presently preferred embodiment of the invention uses this distance metric as a basis for clustering documents in groups in such a way that the distance between any two documents in a cluster is smaller than the distance between documents across clusters.

An advantage of the clusters thus generated is that they can be organized hierarchically by approximating the distance metric by what is called a tree metric. Such metrics can be effectively computed, with very little loss of information, from the distance metric that exists in the document space. The loss of information is related to how effectively the tree metric approximates the original metric. The approximation is mathematically proved to be within a logarithmic factor of the actual metric. Hierarchically generated metrics then can be used to compute a taxonomy. One way to generate a taxonomy is to use a parameter that sets a threshold on the cohesiveness of a cluster. The cohesiveness of a cluster can be defined as the largest distance between any two documents in the cluster. This distance is sometimes referred to as the diameter of the cluster. Based on a cohesiveness factor (loosely defined as the average distance between any two points in a cluster), nodes in the tree can be merged to form bigger clusters with larger diameters, as long as the cohesiveness threshold is not violated.

Figure 1:
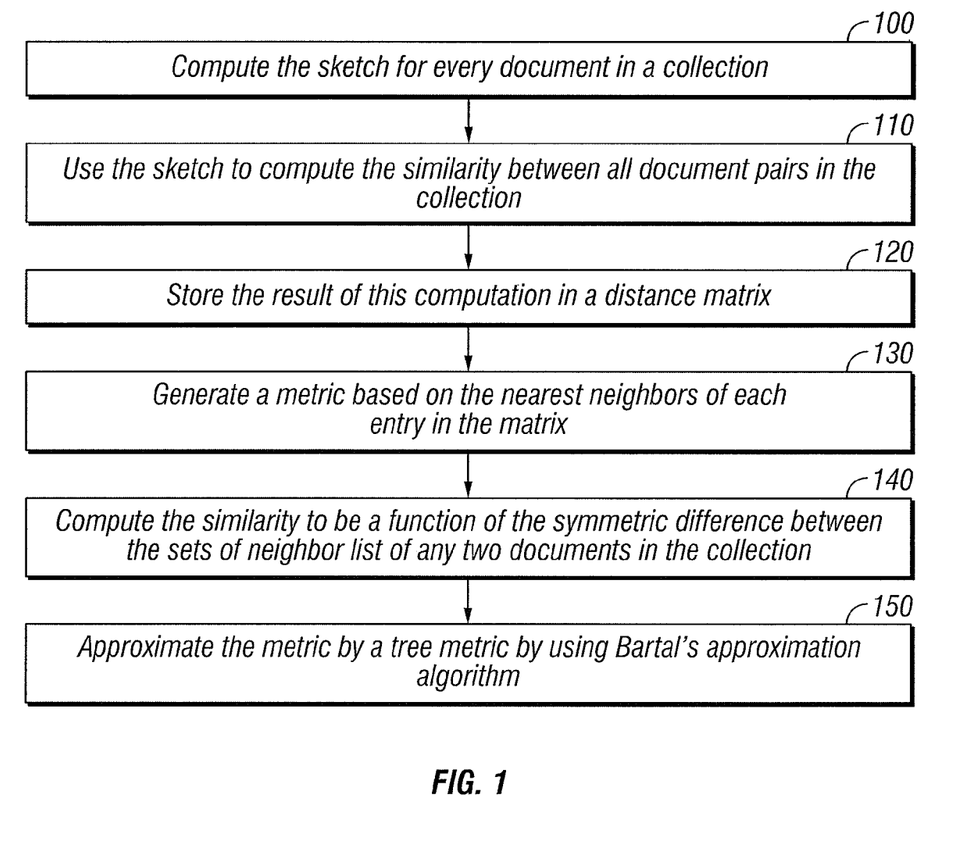
FIG. 1 is a flow diagram showing a document clustering algorithm according to some embodiments of the present invention.

FIG. 1 is a flow diagram showing a document clustering algorithm according to the invention. The following is an outline of a presently preferred algorithm for computing the hierarchical clustering in the document space.

Compute the sketch for every document in a collection (100). The sketch is then used to compute the similarity between all document pairs in the collection (110). The result of this computation is stored in a distance matrix (120). The distance matrix is a sparse matrix. A sparse matrix has many zero entries. Thus, the number of non-zero entries in a sparse matrix is much smaller than the number of zeroes in the matrix. Data structures/formats are used to store and manipulate such matrices efficiently.

Then generate a metric based on the nearest neighbors of each entry in the matrix (130). The number of neighbors is a parameter that can be modified by the user. The similarity is then computed (140) to be a function of the symmetric difference between the sets of neighbors of any two documents in the collection. The symmetric difference of two sets A and B is:

(A−B)∪(B−A)

This is chosen over direct comparison of document sketches because, by including a larger document set that does not necessarily use the same words or phrases to describe similar concepts, it is richer in comparing content.

The metric is then approximated by a tree metric (150) by using Bartal's approximation algorithm (see Y. Bartal, *Probabilistic Approximations of Metric Spaces and its Algorithmic Applications*, IEEE Conference on Foundations of Computer Science, 1996). The size of each cluster and the depth/width of the hierarchical clusters can be controlled by the number of nearest neighbors included in the metric computation.

Document Sketch

As discussed above, it would be desirable to provide a method to compute document sketches that allows for effective and efficient similarity computations among other requirements. The following discussion concerns a presently preferred embodiment for computing the sketch for the document.

A basic fingerprinting method involves sampling content, sometimes randomly, from a document and then computing its signature, usually via a hash function. Thus, a sketch consists of a set of signatures depending on the number of samples chosen from a document. An example of a signature is a number $\{i \square \{1, \ldots, 2^l\}$, where l is the number of bits used to represent the number. Broder's algorithm (supra) uses word shingles, which essentially is a moving window over the characters in the document. The words in the window are hashed before the window is advanced by one character and its hash computed. In the end, the hashes are sorted and the top-k hashes are chosen to represent the document. It is especially important to choose the hash functions in such a way as to minimize any collisions between the resulting sketches.

Figure 2:
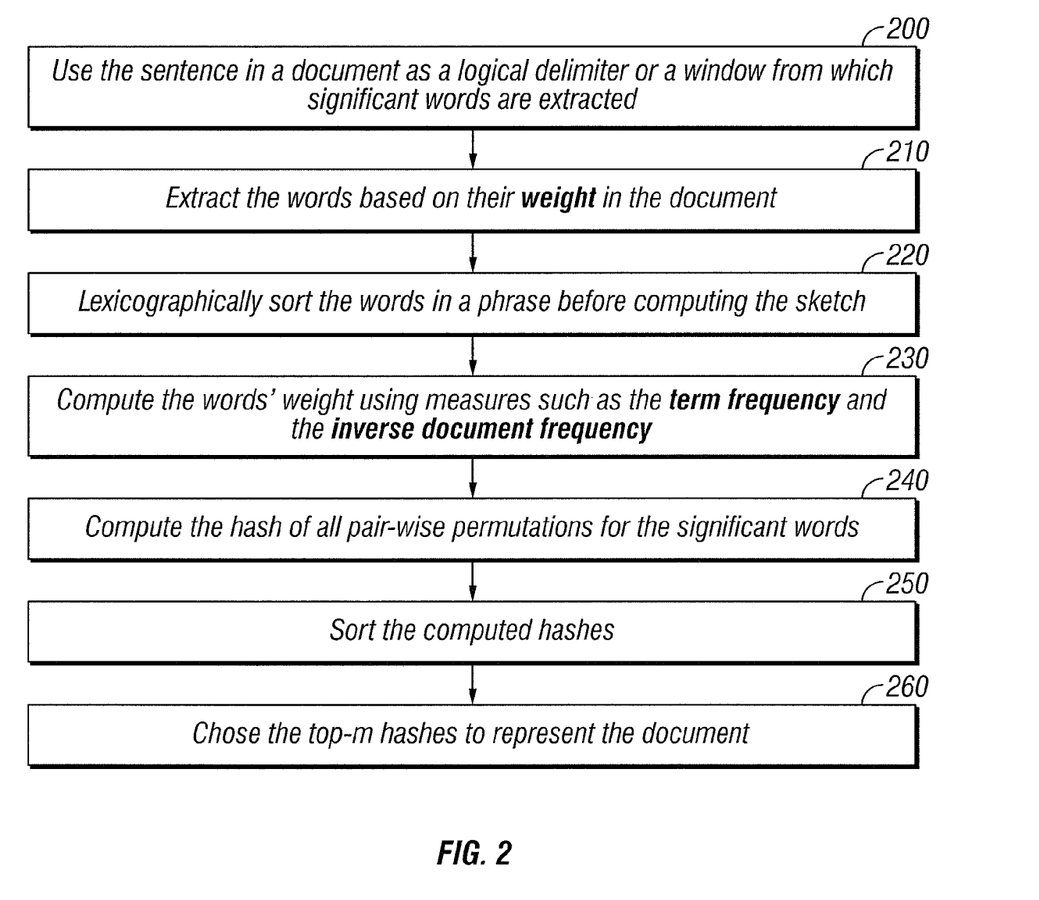
FIG. 2 is a flow diagram showing a document sketch algorithm according to some embodiments of the present invention.

FIG. 2 is a flow diagram showing a document sketch algorithm according to the invention. In a presently preferred embodiment of the invention, the following algorithm is use to compute the document's fingerprint:

Unlike the existing fingerprinting algorithms that use word shingling to compute a sketch, the presently preferred embodiment of the invention uses the sentence in a document as a logical delimiter or window from which significant words are extracted (200) and the hash of all their pair-wise permutations is computed (240). The words are extracted based on their weight in the document (210) which can be computed (230) using measures such as the term frequency and the inverse document frequency. For example, if the top three words in a sentence are ebrary, document, and DCP, the invention computes the hashes for the phrases "document ebrary," "DCP ebrary," and "DCP document." The invention lexicographically sorts the words in a phrase before computing the sketch (220). This way it is only necessary to compute the hash of three phrases instead of six. By choosing a sentence as a logical window, the invention implicitly considers the semantics of each word and its relationship to other words in the sentence. Furthermore, by considering the top-k words and the resulting phrases, the invention captures the content of the sentence effectively.

The computed hashes are then sorted (250) and the top-m hashes are chosen to represent the document (260). Typical values of m are 256 to 512 for large documents (>1M).

Applications of this embodiment of the invention include how such sketches are transported efficiently, e.g. using Bloom filters, compute the sketch of a hierarchy or a taxonomy given the sketches of the documents in the taxonomy. Maintaining the sketch for a taxonomy or a collection can help in developing efficient algorithms to deal with distributed/remote collections.

Some Applications of the Invention

Some of the applications of the above inventions include but are not limited to:

Selection based associative search of documents. Unlike traditional search wherein a user types a query, composed of a small number of words, a sketch based approach enables the user to select a section of a document and then look for documents containing similar information.

Automatic taxonomy generation and clustering of documents. The tree metric approach has the advantage of maintaining the original distances between documents while at the same time organizing the documents in a hierarchy. Secondly, the tree structure allows for efficient extraction of taxonomies from the tree metric. Automatic creation of taxonomies helps in overcoming bottlenecks created by categorization of a large collection of documents. One can use such a method for on-line classification wherein documents arrive into the system at different times and they need to be indexed in an existing taxonomy. Note that each node in the taxonomy could be considered as a cluster. This is different from the first case in which a taxonomy is created from the given document collection.

The compact representation of a sketch is useful in supporting a number of operations on documents and collections. One operation is computing similarities for associative search. Another use is in a distributed environment for collaboratively shared documents. A sketch provides a method for efficient inter-repository distribution, communication, and retrieval of information across networks wherein the whole document or a collection need not be transported or queried against. Instead the sketch substitutes for a document in all the supported computations. Furthermore, an efficient associative search provides for an enhanced turn-away feature by offering similar books when the requested document is not available.

Dealing with sketches instead of documents allows a system to support efficient navigation and traversal of documents in a collection. This is based on a notion of 'nextness' in the navigation space which is analogous to 'closeness' in the metric space in which the documents exist. For example, a traversal order of a document set given a query document can be constructed from the nearest neighbors of the query document in the metric space. This interface can be extended to a cluster or group of documents by using a tree metric wherein the user can traverse a set of document clusters based on their closeness in the underlying metric space.

Figure 3:
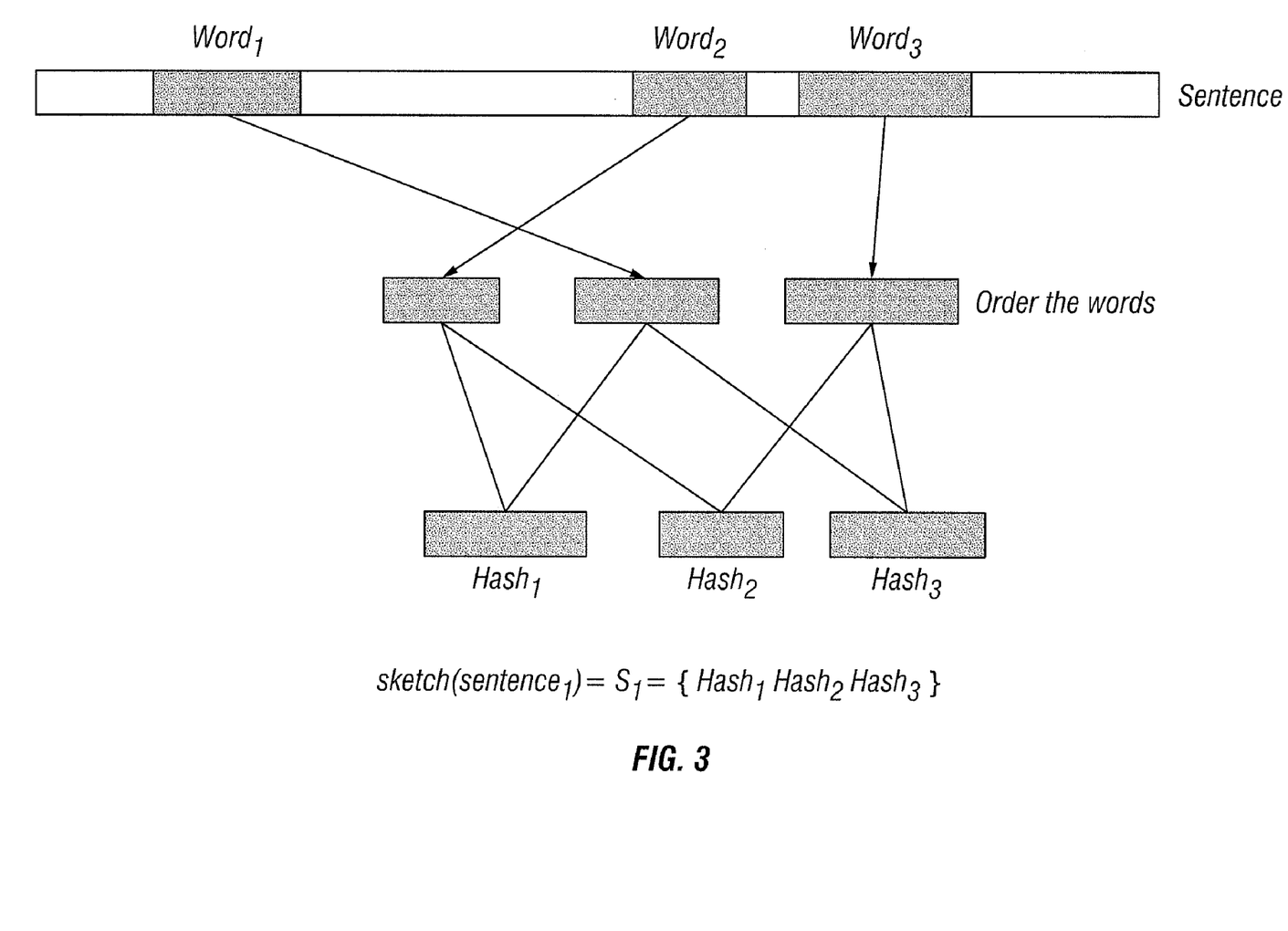
FIG. 3 is a block diagram illustrating computing a sketch of a sentence, according to some embodiments of the present invention.
Figure 4:
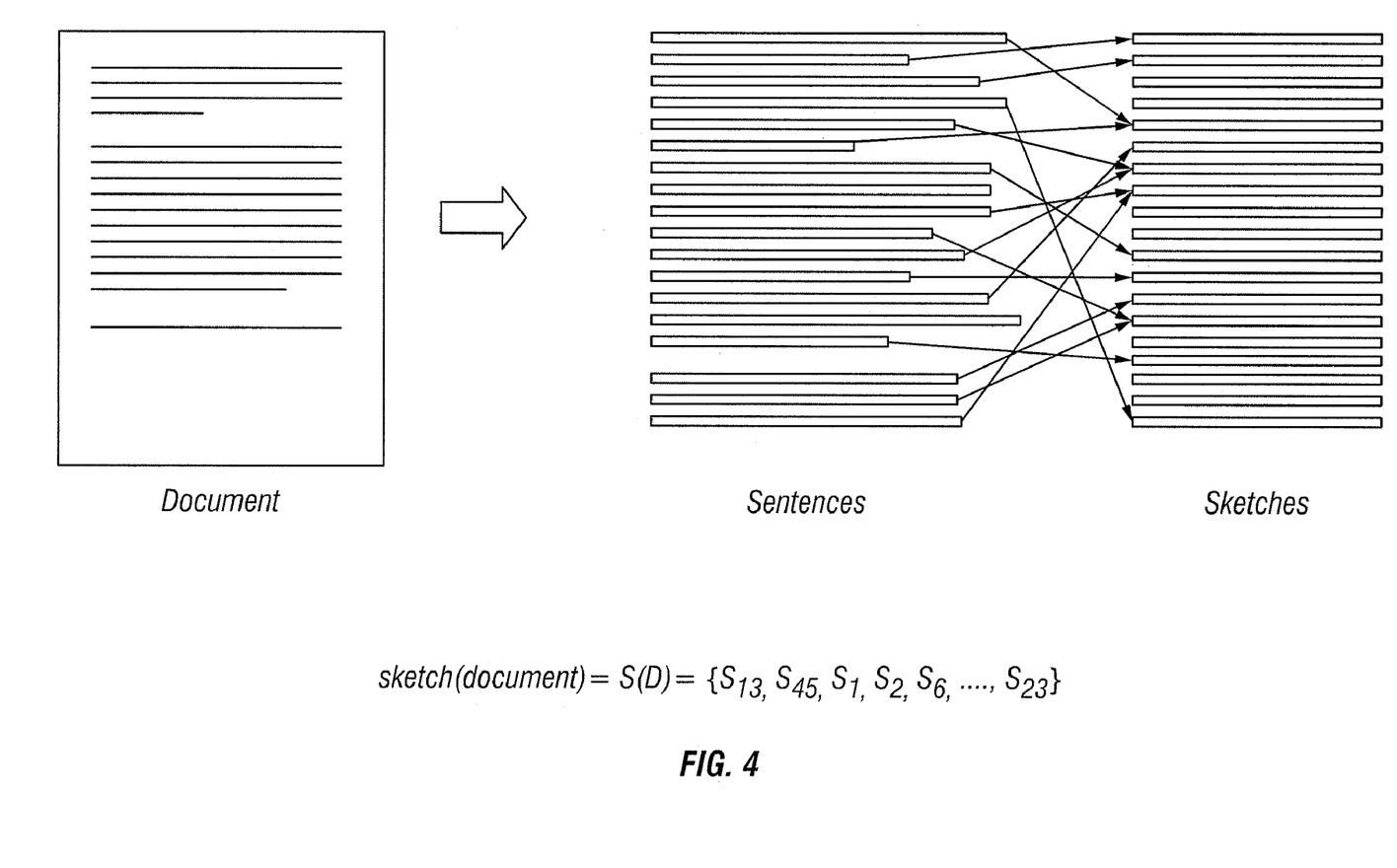
FIG. 4 is a diagram illustrating computing the sketch of a document, according to some embodiments of the present invention.
Figure 5:
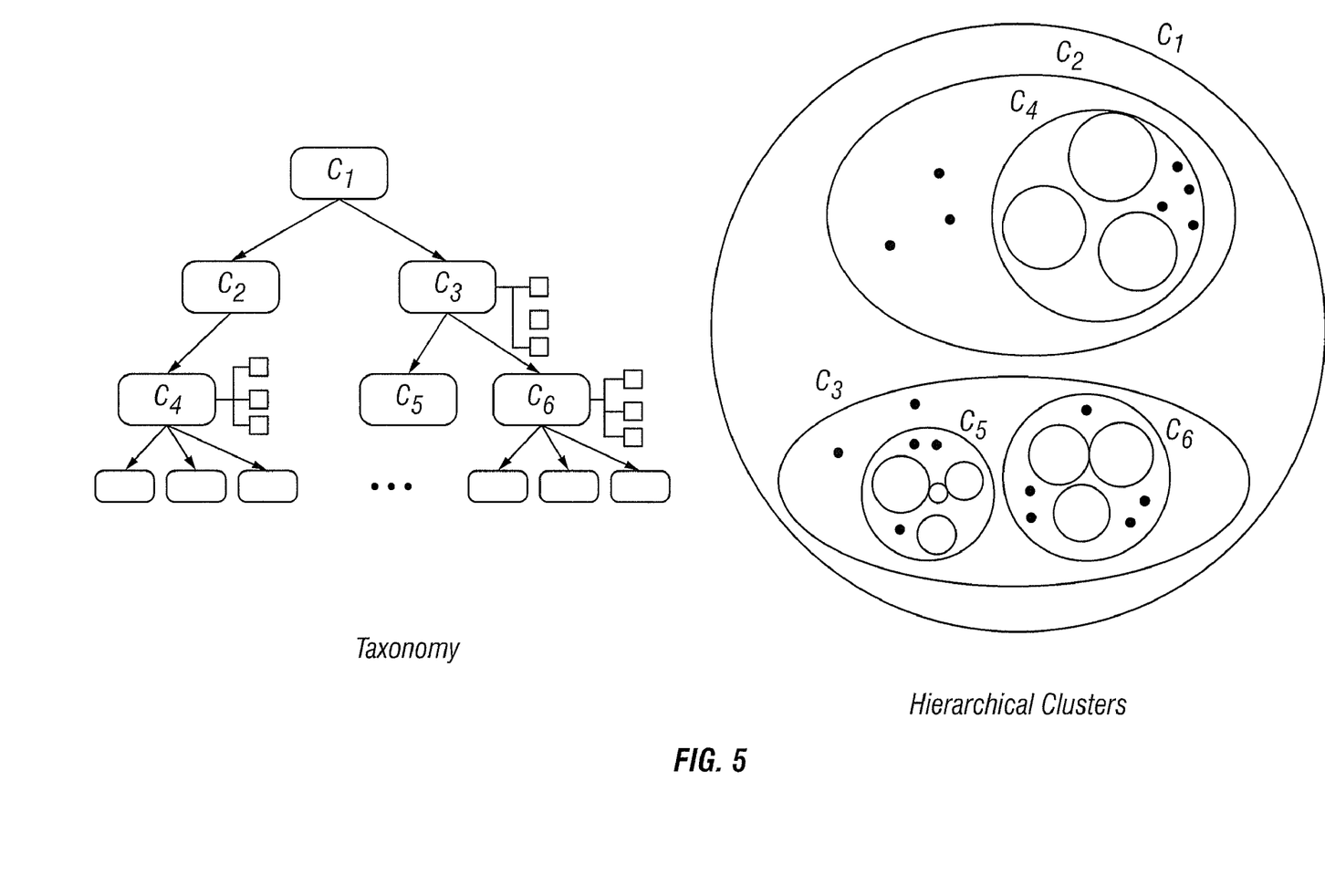
FIG. 5 is a diagram illustrating mapping from the cluster space to a taxonomy, according to some embodiments of the present invention.

FIGS. 3-5 illustrate certain functionality according to some embodiments of the present invention. More specifically, FIG. 3 illustrates computing a sketch of a sentence, according to some embodiments of the present invention, FIG. 4 illustrates computing the sketch of a document, according to some embodiments of the present invention, and FIG. 5 illustrates mapping from the cluster space to a taxonomy, according to some embodiments of the present invention.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An automatic document classification apparatus, comprising:
a system comprising a processor configured for automatically generating document sketches by using a sentence in a document as a logical delimiter from which significant words are extracted and, thereafter, for each sentence computing a hash of all pair-wise permutations of said significant words which are extracted from said sentence, wherein said significant words are extracted based on a word's weight in the document, which is computed using measures comprising either of term frequency and inverse document frequency;
said processor configured for using said document sketches for automatically classifying a collection of documents into clusters based on a distance metric, wherein distance between any two documents in a cluster is smaller than the distance between documents across clusters; and
said processor configured for automatically classifying a new document into an appropriate document cluster based upon said distance metric;
said processor applying said automatic classification of said new document into an appropriate document cluster based upon said distance metric to effect at least one of:
user selection of a section of a document to identify documents containing similar information;
automatic taxonomy generation and clustering of documents;
inter-repository distribution, communication, and retrieval of information across networks, wherein said document sketch is substituted for a document; and
constructing a traversal order of a document set from nearest neighbors of a query document in a metric space.

2. The apparatus of claim 1, further comprising:
said processor configured for organizing said clusters hierarchically by approximating said distance metric by a tree metric.

3. The apparatus of claim 2, further comprising:
said processor configured for generating a taxonomy by using a parameter that sets a threshold on cohesiveness of a cluster, wherein cohesiveness of a cluster comprises a largest distance between any two documents in said cluster.

4. The apparatus of claim 3 wherein, based on said cohesiveness, nodes in the taxonomy comprise clusters that can be merged to form bigger clusters having larger diameters, as long as said cohesiveness threshold is not violated.

* * * * *